United States Patent [19]

Sebastiano et al.

[11] Patent Number: 4,751,145

[45] Date of Patent: Jun. 14, 1988

[54] PROCESS FOR MANUFACTURING A SAFETY GLASS FOR MOTOR VEHICLES AND BUILDINGS, AND PRODUCT SO OBTAINED

[75] Inventors: Francesco Sebastiano, Termoli; Luigi Capriotti, San Benedetto del Tronto, both of Italy

[73] Assignee: Societa' Italiana Vetro - SIV - S.p.A., Chieti, Italy

[21] Appl. No.: 11,865

[22] Filed: Feb. 4, 1987

[30] Foreign Application Priority Data

Feb. 19, 1986 [IT] Italy ............................... 19459 A/86

[51] Int. Cl.$^4$ .......................... B32B 27/40; B05D 3/06
[52] U.S. Cl. .................... 428/425.6; 427/54.1; 427/165; 427/240; 427/379; 427/389.7; 428/333; 428/442
[58] Field of Search ................ 427/54.1, 240, 165, 427/389.7, 379; 522/40, 103; 428/425.6, 442, 333

[56] References Cited

U.S. PATENT DOCUMENTS

| | | | |
|---|---|---|---|
| 3,931,113 | 1/1976 | Seeger et al. | 528/85 X |
| 3,932,337 | 1/1976 | Shah | 528/85 X |
| 4,041,208 | 8/1977 | Seeger | 428/425.6 |
| 4,138,299 | 2/1979 | Bogliano | 427/54.1 X |
| 4,188,455 | 2/1980 | Howard | 427/54.1 X |
| 4,197,333 | 4/1980 | Leach et al. | 427/54.1 |
| 4,225,631 | 9/1980 | Berger et al. | 427/54.1 |
| 4,232,080 | 11/1980 | Orain et al. | 427/165 X |
| 4,337,296 | 6/1982 | Varadhachary | 427/54.1 |
| 4,415,604 | 11/1983 | Nativi | 427/54.1 |
| 4,541,881 | 9/1985 | Sebastiano | 156/99 |

FOREIGN PATENT DOCUMENTS 0066654  9/1975  Australia .

Primary Examiner—Thurman K. Page
Attorney, Agent, or Firm—Wenderoth, Lind & Ponack

[57] ABSTRACT

The invention relates to a manufactured article formed of two transparent layers, preferably one made of glass and the other made of plastic, adapted to be used as glazing for motor vehicle windows and buildings, consisting of a glass substrate onto which is applied a single-layer plastic comprising a composition of polycaprolactones, a vinyl monomer N-vinyl-2-pyrrolidone, mono-, di-, tri-, tetra-acrylic monomers, a photoinitiator, and flow control agents, reaction catalysts, solvents, plasticizers and adhesion promoters, and aliphatic polyisocyanate, which composition is distributed as a liquid with uniform thickness over the surface, which is spun and exposed to ultraviolet radiation to form the coating.

24 Claims, No Drawings

PROCESS FOR MANUFACTURING A SAFETY GLASS FOR MOTOR VEHICLES AND BUILDINGS, AND PRODUCT SO OBTAINED

The present invention relates to a manufactured glass article onto which is applied a single-layer plastic coating for the purpose of improving its behavior on impact damage, and to a method for applying the coating to a glass substrate.

The product according to the invention can find advantageous application as a windshield for vehicles, and therefore the specification that follows will refer to windshields but without implying any limitation of the uses of the invention, which can include manufacture of other types of articles such as side windows for vehicles or glazing for buildings. The automobile industry employs two known types of windshield, normally described as laminated glass products or tempered glass products.

In laminated glass windshield a sheet of highly thermoplastic flexible plastic, generally of plasticized polyvinyl butyral and less frequently of polyurethane, is laminated between two sheets of glass bonded to each other under heat and pressure.

In the case of tempered glass windshield a single glass panel undergoes a rigorously controlled heat treatment cycle, optionally preceded by a chemical surface treatment.

Such types of windshield have been proposed to lessen the risk of injury to driver and/or passengers if the windshield is broken accidentally.

In laminated glass windshield, the fragments of broken glass are held together as a result of the flexibility and yieldability of the intermediate layer, its adherence to the glass due to the formation of physical bridges, high tensile strength and good ultimate elongation.

Resistance to penetration of the laminated glass windshield by stones and like objects striking windshield is good; but when this type of windshield is broken a certain number of small, needle-shaped glass fragments are always formed, can come off the windshield at a relatively high speed and can seriously injure the eyes and unprotected parts of the skin of the occupants of the vehicle, such types of injury being generally known as lacerated wounds.

In tempered glass windshield behavior on impact damage is entirely different in that this type of windshield fractures over its whole surface into small, regularly sized pieces wholly devoid of sharp cutting edges and there are no needle-shaped particles that can come off. Since the entire windshield fractures, its resistance to penetration by flying objects is however low, and the occupants of the vehicle therefore run the risk of severe injury by such objects.

The laminated glass windshield is generally held to be superior to the tempered glass windshield, and it will thus be appreciated that it is desirable to eliminate its characteristic of forming flying particles of the lacerating type, so as to improve the safety of motor vehicles.

A standard type of laminated glass windshield consists of two bonded glass sheets, of about 2.5-mm thickness each, and a plasticized polymeric plastic interlayer which is about 0.75-mm thick. The different processes that can be used to assemble the structure are well-known to persons with ordinary skill in the art. Various methods have been employed to attempt to reduce the severity of the lacerated wounds caused: thus U.S. Pat. Nos. 3,881,043, 3,931,113 and 4,041,208 granted to P.P.G. describe various polyurethane compounds for forming intermediate layers having improved adhesiveness to the glass compared to polyvinyl butyral; for example it is suggested to laminate, between two glass sheets, a preformed polyurethane sheet obtained through the reaction of:

(a) a hydroxyl-terminated polyester of caprolactone, polybutylene adipate, polybutylene azelate or mixtures;

(b) a diol with molecular weight less than 250, preferably 1,4 butane diol, and (c) a cycloaliphatic di-isocyanate.

Tests have, however, shown that when a laminated glass windshield is broken most of the lacerating fragments are produced by the glass surface not in contact with the intermediate layer, so none of the processes designed to improve the intermediate layer solves the problem of lacerating fragments.

An alternative solution is described in German patent application No. 2,629,799 of July 2, 1986 of St. Gobain, which proposes the preparation of an anti-lacerating windshield wherein a polyvinyl butyral film is bonded between two glass sheets and this laminate has added to it, on an outer glass sheet, a preformed polyurethane layer obtained by the reaction of:

(a) a polyester with free hydroxyl groups;

(b) an aliphatic polyisocyanate.

These outer films have shown themselves to be truly optimal in eliminating the formation of lacerating glass fragments, especially in respect of flat glass. However, given that most motor vehicles are fitted with curved windshields calling for different radii of curvature -sometimes very small- the practical problems involved in laminating such sheets to glass surfaces are very great and further difficulties arise from the need to obtain windshields with no optical distortion effects and without delamination tendencies on ageing.

U.S. Pat. No. 4,197,333 discloses a method for coating the outer surface of a lamp (for example a photoflash lamp) with a transparent protective film, wherein a coating consisting of a high viscosity (3000 to 5000 centipoise) photopolymerizable composition is applied by a special dispensing method, whereby the lamp is rotated under a special dispenser and the resultant coating is cured by ultraviolet light.

No methods are known in the art whereby materials of such viscosity can be applied to a vehicle windshield as heretofore described. Moreover, the compositions described do not produce films having the properties called for by windshield coatings.

Australian Pat. No. 66,655/74 describes a process for preventing glass bottles from shattering, wherein a powder with practical size from 1 to 100 microns of a solid component having a melting point over 20° C. is dispersed in a normoliquid polyurethane prepolymer and is coated onto the outside of the bottle, the coating being subsequently cured by heat.

Tests have shown unequivocally that such films are wholly without the clarity, adhesion to glass and also scratch resistance required for a windshield coating.

Italian Patent Application No. 19779 A/83 of the present Applicant proposes a process for producing a windshield coating to reduce the formation of lacerating fragments, which process provides for the polymerization "in situ" of a crosslinked acrylic vinyl polymer, a polycaprolactone aliphatic polyisocyanate polyurethane, and a prepolymerized linear polyester-acrylated polyurethane in a closely controlled amount.

The present-day trend in the trade, especially as regards motor vehicles but also as regards buildings, attempts to reduce the weight of the glass or glazing employed to an appreciable extent, without thereby adversely affecting the safety requirements as per the international requirements laid down by ANSI, ECE, DIN, UNI, etc. Standards.

An example of this trend is for instance provided by duplex glazings, given this name in that they are formed of only two layers of different materials which are intimately joined together.

These duplex products consist of a layer of glass and a layer of plastic material, it being necessary for the latter to possess specific mechanical and optical properties in addition to those already mentioned and known in the art, defined as non-lacerating, self-sealing, scratch-and ageing-resistance.

To manufacture a product of the duplex type industrially, the problem has to be solved by identifying a particular formulation of organic compounds such as will give rise to a single-layer plastic coating that not only provides the end-product with the physical, mechanical and optical properties required but which can also be distributed on substrates with relatively large and concave surface areas, so as to be of constant thickness at all the points to be coated.

In addition, such coating must have good passive resistance to rupture, and such resistance can be obtained with thicknesses generally not below 300 microns.

The object of the present invention is, therefore, to provide a single-layer plastic coating, obtained by "in situ" polymerization directly on the glass substrate, such as possesses the properties of clarity, non-laceration, self-sealing, scratch-and ageing-resistance and such as is at the same time adapted to impart to the final duplex product the characteristics of safety required by international standards.

Another object of the present invention is to provide a process for low-cost industrial manufacture of this novel type of duplex article such as having all the characteristics required by safety regulations, it remaining understood that both the plastic layer forming the object of the invention and the process for applying it can also find advantageous use for coating a normal stratified product consisting of two glass sheets which conventionally are laminated using a sheet of polyvinyl butyral.

In accordance with the invention the process for manufacturing a safety glass, in particular for motor vehicles or buildings, consisting of at least one glass sheet to which a plastic coating is bonded, is characterized by:

formation of a liquid coating composition comprising:
  (a) a solution of polycaprolactones with molecular weight between 200 and 1200 and polyethers with molecular weight between 250 and 1000, dissolved in between 10% and 40% of
  (b) a mixture of a vinyl monomer N-vinyl-2-pyrrolidone, with at least 10 and not more than 105% of mono-, di-, tri-, or tetra-acrylate monomers, such as: 2-ethylhexylacrylate; butoxyethoxyethyl acrylate; 1,4-butanediol diacrylate, ethyleneglycol diacrylate; neopentylglycol diacrylate; hexanediol diacrylate; diacrylic derivative of bisphenol A; diethyleneglycol diacrylate; tripropyleneglycol diacrylate; tetraethyleneglycol diacrylate; trimethylolpropane triacrylate; pentaerythritol triacrylate; pentaerythritol tetraacrylate;
  (c) a photoinitiator such as 2-hydroxy-2-methyl-1-phenylpropan-1-one or a substituted derivative thereof or a mixture thereof added in an amount between 0.5 and 3% of the total composition;
  (d) one or more silicone flow control agents or fluorinated flow control agents in an amount of 0.1 to 0.4%;
  (e) reaction catalysts in an amount of 0.02 to 0.4%.
  (f) an aliphatic polyisocyanate in an amount sufficient to react with an amount less than the stoichiometric amount of the hydroxyl groups present in the initial part of the composition (i.e. with an -NCO index ranging from 1.01 to 1.1) added immediately before use);

application to the glass sheet of the coating composition with a viscosity between 40 and 200 centipoise immediately after preparation and before any significant change in viscosity caused by the initiation of the reaction between the hydroxyl groups and the isocyanate groups in the composition;

after application of the composition, spinning of the glass sheet at around 10 to 50 rpm so as to ensure a constant thickness spread of the coating composition film over the entire surface of the sheet and to ensure that the thickness is kept constant at between 80 and 150 microns;

exposure of the film to a high-intensity ultraviolet light source for a time sufficient to complete the polymerization of the acrylic and vinyl monomers;

heat-treatment of the coated glass sheet to complete the formation of polyurethane from the hydroxyl and isocyanate groups of the polyisocyanates.

The coating composition in accordance with the invention further advantageously comprises:
  (g) a middle or high-boiling solvent such as toluene, xylene, acetates, etc., in an amount from 5 to 15%.
  (h) plasticizers such as di-octyl phthalate (DOP), dibutyl phthalate (DBP), tri-n-butyl phosphate (TBP), benzylbutyl phthalate (BBP), di-isobutyl phthalate (DIBP) or others, in an amount from 5 to 15%;
  (i) adhesion promoters such as zirconium methacrylates or titanates or silanes with chemical functions suitably chosen to promote the anchorage between glass support and polymer matrix.

Such coating composition is preferably applied by spraying or curtain coating on the concave surface of the glass substrate, previously curved or 'bowed' and/or tempered so as to take on its required final shape and structure.

At the time of mixing, the viscosity of the composition is from 40 to 200 centipoise and spraying or curtain coating should be carried out before there is any significant change in viscosity due to the initiation of the reaction between the hydroxyl and isocyanate groups in the composition.

Immediately after spraying or curtain coating the glass substrate is spun at around 10-50 rpm so as to ensure a constant spread-thickness of the coating composition film over the entire surface of the substrate and to ensure that thickness uniformity is maintained up to the time of the subsequent ultraviolet radiation treatment.

When the coating has been evenly distributed over the surface of the substrate with a wet film thickness of 80 to 150 microns, curing of it has then already started as a result of the reaction of the isocyanate groups with the hydroxyl groups.

Spinning lasts around 5 to 10 minutes, the exact period depending on the viscosity increase of the mixture distributed over the substrate. The film is then exposed to a high-intensity UV light source, preferably an emission of relatively broad spectrum as is produced by a medium mercury pressure lamp operating at an intensity of 40 watts per centimeter, for a period sufficient to complete the polymerization of the acrylic and vinyl monomers, which process can take from 2 seconds to 1 minute.

This state can be identified by the fact that the film at once undergoes a noticeable increase in viscosity, and is thus firm and stable. When under exposure to UV radiation, the substrate continues to rotate at a speed of around 10 to 50 rpm.

When UV radiation and spinning have been completed, the substrate is given (if necessary) further spraying, spinning and UV radiation treatments until such time as the coating reaches the desired thickness, in any case generally not less than 200 microns, preferably not less than 300 microns.

Immediately thereafter the infrared treatment is given, which treatment can be replaced by or supplemented with a different type of heat treatment, in order to complete the formation of polyurethane from the hydroxyl groups and isocyanate groups of the polyisocyanates. The intensity and duration of the heat treatment must be such as to lead to formation of a final single-layer film having clearly defined and desired characteristics.

It is essential for the surface of the substrate to be clean before applying the coating, and this can certainly involve washing with water-plus-detergent followed by low-temperature drying with a dust-free stream of hot air.

Adhesion between glass sheet and substrate can on occasion be improved by pretreating the glass surface with an alcoholic or hydroalcoholic solution of a selected compound of organic silane, for example methylacryl-oxypropyl-trimethoxysilane as a 2% solution in isopropanol, then drying gently in warm air, or with a silane, having a suitable function and capable of reacting both with polymer and glass, dissolved directly in the reaction mass. Such treatments are however not always necessary.

Test methods for safety glass windshields are set out in the American Safety Council "Standard Code for Safety Glazing Materials for Glazing Motor Vehicles Operating on Land Highways", July, 1966, Ref. Z 26.1, and these test methods are generally used in industry. The coating in accordance with the invention guarantees both a clarity on a par with that of glass, and the optical and light stability required by the strict ANSI Standards in force in the U.S.A. and the ECE standards in force in E.E.C. states.

The degree of optical distortion must be measured, for example, according to ANSI Standard Z 26.1, paragraph 5.15; optical properties must be measured, for example, according to ECE Standard R 43; light stability properties must be measured, for example, according to ANSI Standard Z 26.1 - 1977, paragraph 5.1.

The characteristics of the invention will become more apparent from an examination of the following examples of actuation thereof.

EXAMPLE 1

A liquid coating composition was prepared as follows:

8.5 moles of a polyether PTHF 300 (supplied by BASF), with molecular weight of approximately 300 and an —OH number of 469 mg KOH/g were added to 2.5 moles of a polycaprolactone with molecular weight 1000, functionality 2 and —OH number 113.5 mg KOH/g (CAPA 214 supplied by INTEROX) which were added to:

1.5 moles of polycaprolactone, functionality 2,4, molecular weight 250 and -OH number 540 mg KOH/G (CAPA 304, supplied by INTEROX), 2.5 moles of a polyether mixture code-named LAB-A-2499, functionality 2,4, molecular weight approximately 800 and -OH number 166 mg KOH/g (supplied by HULS), 4.5 moles of a polycaprolactone with molecular weight 1000, functionality 4 and -OH number 211.46 mg KOH/G (CAPA 800 supplied by INTEROX)

0.5 mole of a polycaprolactone with molecular weight 1000, functionality 2 and —OH number 112 mg KOH/g.

After homogenization, addition was made to such mixture of 5 g of tributyl phosphate, 12 g of N-vinylpyrrolidone, 12 g of 2-ethylhexyl acrylate, 1.7 g of trimethylolpropane triacrylate, 8.3 g of a middle/high-boiling solvent, 0.15 g of a mixture of silicone agents, 0.6 g of a photoinitiator, 0.06 g of catalyst DBTL (dibutyl-dilauryl-Sn).

The whole mixture was dried and dearated as taught by the art and addition was then made to it of 29.2 g of an isocyanic polyadduct (31% NCO) supplied by Huls.

Following homogenization, the viscosity of this mixture at 23° C. was around 62 centipoise, and it was sprayed onto a curved and physically tempered glass sheet, thickness 3.1 mm, so as to obtain a wet film thickness of approximately 100 to 150 microns. The resultant layer was spun for 5 minutes at approximately 15 to 25 rpm and then underwent a brief exposure to UV radiation lasting between 1 and 5 seconds during the final phase of spinning. The UV radiation and spinning were terminated simultaneously and the coated article underwent further and identical spray, spinning and UV exposure operations until such time as a film thickness of approximately 500 to 700 microns was obtained.

When the desired thickness had been obtained the coated product was given IR treatment such that the temperature on the coated surface of the glass sheet was between 75° and 120° C., for a duration ranging from 60 to 180 minutes.

After this period the product was cooled in air and, after a 7-day interval, was tested in accordance with the regulations in force, which it satisfied, demonstrating among other things great effectiveness in eliminating flying glass fragments and formation of very blunt fragments on fracture.

These tests were repeated after 3,000 hours of artificial ageing: the results showed that there was no significant deterioration of the mechanical and optical properties of the coated product.

EXAMPLE 2

Spray-application was conducted on a chemically tempered, curved glass substrate, thickness 1.8 mm, of a liquid mixture comprising:

4 g of PTHF 300 (polyether)
6.5 g of PTHF 1000 (polyether)
13 g of PTHF 650 (polyether)
3 g of CAPA 212 (polycaprolactone)
8 g of CAPA 305 (polycaprolactone)
3 g of CAPA 800 (polycaprolactone)
2 g of CAPA 793 (polycaprolactone)

There were then homogenized and added 7.5 g of NVP (N-vinyl-2-pyrrolidone), 5 g of 2-ethylhexyl acrylate (HEA), 0.5 g of pentaerythritol tetracrylate, 0.2 g of silicone flow control agents (SILWET L77 and 7500 in equal parts by weight), 0.3 g of a photoinitiator as at c) above, 0.02 g of a catalyst such as mercury salt type TORCAT 535 (supplier THOR) and the whole mixture was held under stirring in vacuo at a temperature close to 100° C. for 3 hours.

After the whole mixture had cooled, addition was made to it of 25.5 g of an isophoron diisocyanate adduct (IPDI) code-named LAB-B-2499 supplied by Hüls. The mixture was then distributed, and the coated product then treated, in exactly the same way as in Example 1, and there were likewise obtained physical, mechanical and optical properties that satisfied the tests according to international regulations even after artificial ageing for 3,000 hours.

EXAMPLE 3

Using the curtain coating method, a mixture of the composition as given below was distributed onto a curved and annealed sheet:

8 moles of PTHF 300
2.3 moles of CAPA 304
0.6 mole of a polyether/polyester code-named CAPA 828-022 (supplied by INTEROX) with molecular weight of 978, functionality 2, -OH number 114.59 mg KOH/g
2.5 moles of polyetheric mixture code-named LAB-A-2499 (supplied by Hüls)
4.1 moles of a CAPA 800
6.8 moles of a polyether/polyester code-named CAPA 828-021 (supplied by INTEROX), with molecular weight 696, functionality 2, —OH Number 160.86 mg KOH/g
0.20 g of suitable silicone flow control agents (SILWET L77-7500-7001)
3.5 g of an adhesion promoter code-named SILANE-Y-9030 (supplied by UC)
12% of ethyleneglycol acetate monoethyl ether solvent
5% of a tributyl phosphate plasticizer
30% of a 1 in 1 mixture of NVP and 2-ethylhexyl acrylate
1 g of TMPTA (trimethylolpropane triacrylate)
0.7 g of a photoinitiator (DAROCUR 1116, supplied by MERCK)
0.04 g of a catalyst (mercury salt TORCAT).

The viscosity of the above composition was 50 centipoise.

The said mixture was distributed and treated in exactly the same way as in the preceding examples, likewise conferring physical, mechanical and optical properties on the duplex products such as satisfied, even after 3,000 hours of artificial ageing, the requirements of international safety regulations.

EXAMPLE 4

A liquid mixture was prepared, of a composition as follows:

19 parts of a polytetrahydrofuran with molecular weight 300, functionality 2, -OH number 469 mg KOH/g
5.4 parts of a CAPA 214 (supplied by INTEROX)
1.5 parts of an N,N,N',N'',N'''-pentamethyldiethylene triamine
17.2 parts of a polyether mixture code-named A2499
20.8 parts of a tetrafunctional polycaprolactone with molecular weight 1000 and -OH number 216.46/KOH/g
20.2 parts of a polytetrahydrofuran, with molecular weight 1000, functionality 2, -OH number 112 KOH/g
0.4 part of a mixture of silicone surfactants
5.8 parts of a plasticizer of the TBP type
23 parts of NVP
23 parts of neopentylglycol diacrylate
3 parts of pentaerythritol triacrylate
15 parts of a middle-boiling solvent
5 parts of an adhesion promoter wherein the molecule comprises the —NCO function
1 part of photoinitiator DAROCUR 1173
0.03 part of DBTL.

Such mixture was suitably deaerated and homogenized and then addition was made to it of 54 parts of a mixture of IPDI (31% -NCO).

After stirring as required, the mixture was sprayed onto a glass substrate and spun for 8 minutes and then exposed to UV radiation for 5 seconds.

The final duplex product was found to possess the desired safety characteristics and, in particular, the film showed itself to have excellent adhesion, even after exposure to damp.

We claim:

1. A process for manufacturing safety glazing, formed of at least one glass sheet to which a plastic coating is bonded, which comprises:
   (1) preparing a coating composition which comprises:
      (a) a solution of polycaprolactone with molecular weight between 200 and 1200 and polyether with molecular weight between 250 and 1000, dissolved in an amount of between 10 and 40% of
      (b) a mixture of a vinyl monomer N-vinyl-2-pyrrolidone, with at least 10% and not more than 105% of a mono-, di-, tri- or tetra-acrylate monomer;
      (c) a photoinitiator in an amount between 0.5 and 3% of the total composition;
      (d) one or more silicone flow control agents or fluorinated flow control agents in an amount of 0.1 to 0.4%;
      (e) reaction catalyst in an amount of 0.02% to 0.4%; and
      (f) an aliphatic polyisocyante in an amount sufficient to react with an amount less than the stoichiometric amount of hydroxyl groups present in the initial part of the composition, with an -NCO index from 1.01 to 1.1, added immediately before use;
   (2) applying to a glass sheet the coating position with a viscosity between 40 and 200 centipoise immediately after preparation and before any significant change in viscosity caused by initiation of reaction between the hydroxyl and isocyanate groups in the composition;
   (3) immediately after applying the composition, spinning the glass sheet at about 10 to 50 rpm so as to ensure a constant thickness spread of the coating composition film over the entire surface of the sheet and to ensure that the thickness is kept constant at between 80 and 150 microns;

(4) exposing the film to a high-intensity UV light source for a time sufficient to complete polymerization of the acrylic and vinyl monomers, and terminating the spinning of the sheet; and (5) heat-treating the coated glass sheet to complete formation of polyurethane from the hydroxyl and isocyanic groups of the polyisocyanates.

2. The process as described in claim 1, wherein the coating composition also comprises:

(g) a middle- or high-boiling solvent in an amount from 5 to 15%.

3. The process as described in claim 1, wherein the coating composition also comprises:

(h) plasticizer in an amount from 5 to 15%.

4. The process as described in claim 1, wherein the coating composition further comprises:

(i) adhesion promoter with chemical functions appropriately chosen to promote anchorage between the glass sheet and polymer matrix.

5. The process as described in claim 1, wherein the coating composition is applied to the glass sheet by spray-coating.

6. The process as described in claim 5, wherein the coating composition has a viscosity of between 40 and 200 centipoise at the time of spray-coating.

7. The process as described in claim 1, wherein the coating composition is applied to the glass sheet in an amount such as to obtain a wet film thickness between 80 and 150 microns.

8. The process as described in claim 1, wherein the glass sheet is spun for a duration of 5 to 10 minutes.

9. The process as described in claim 1, wherein the high-intensity UV light source has a relatively wide emission spectrum, and consists in particular of a medium mercury-pressure lamp operating at an intensity of about 40 watts per centimeter, and wherein the exposure lasts between about 2 seconds and one minute.

10. The process as described in claim 1, wherein after the exposure of one coating layer to UV light a new layer the coating composition is distributed over such layer to form a further coating layer and wherein this procedure is repeated up to the exposure to UV light until such time as there is obtained a coating of total thickness not less than 200 microns, after which final heat treatment of the process is carried out.

11. Safety glazing obtained in accordance with the process as described in claim 1.

12. Safety glazing as described in claim 11, wherein the coating has a thickness of not less than 300 microns.

13. Safety glazing as described in claim 11, wherein the glass sheet consists of an annealed glass sheet.

14. Safety glazing as described in claim 11, wherein the glass sheet is curved and the coating is applied onto the concave side of the sheet.

15. Safety glazing as described in claim 11, wherein the glass sheet is curved and tempered before the coating is applied.

16. Safety glazing as described in claim 15, wherein the glass sheet is of the laminated type, consisting of at least two glass sheets between which a plastic interlayer is applied.

17. The process as described in claim 1, wherein the safety glazing is for a motor vehicle or a building.

18. The process as described in claim 1, wherein the mono-, di-, tri- or tetra-acrylate monomer is selected from the group consisting of 2-ethylhexylacrylate, butoxyethoxyethyl acrylate, 1,4-butanediol diacrylate, ethyleneglycol diacrylate, neopentylglycol diacrylate, hexanediol diacrylate, diacrylic derivative of bisphenol A, diethyleneglycol diacrylate, tripropyleneglycol diacrylate, tetraethyleneglycol diacrylate, trimethylolpropane triacrylate, pentaerythritol triacrylate and pentaerythritol tetraacrylate.

19. The process as described in claim 1, wherein the photoinitiator is 2-hydroxy-2-methyl-1-phenyl-propan-1-one, a substituted derivative thereof, or a mixture thereof.

20. The process as described in claim 2, wherein the solvent is selected from the group consisting of toluene, xylene and acetates.

21. The process as described in claim 3, wherein the plasticizer is selected from the group consisting of di-octyl phthalate, di-butyl phthalate, tri-n-butyl phosphate, benzylbutyl phthalate and di-isobutyl phthalate.

22. The process as described in claim 4, wherein the adhesion promoter is selected from the group consisting of zirconium methacrylates, titanates and silanes.

23. The process as described in claim 10, wherein the total thickness of the coating is not less than 300 microns.

24. Safety glazing as described in claim 11, for a motor vehicle or a building.

* * * * *